United States Patent Office 2,702,815
Patented Feb. 22, 1955

2,702,815

PREPARATION OF PHTHALONITRILES

Harry M. Walker, Dickinson, Tex., assignor to Monsanto Chemical Company, St. Louis, Mo., a corporation of Delaware No Drawing. Application September 30, 1953,
Serial No. 383,411

5 Claims. (Cl. 260—465)

This invention is directed to a process for the production of phthalonitriles and more particularly to the preparation of phthalonitriles from benzonitrile.

Several methods, both catalytic and non-catalytic, have been proposed and developed for the production of aromatic dinitriles. The one in more general use is the catalytic vapor-phase reaction of the dicarboxylic acids or their corresponding anhydrides or imides with ammonia. While it is an effective process on a commercial scale, it requires very careful control during operation as well as elaborate and expensive equipment. Another method in current use involves the dehydration of carboxylic acid amides, imides, or ammonium salts in solution in a tertiary base by means of phosgene or halogen compounds of phosphorus and sulfur. The cost of the starting materials and the number of steps involved in such a process, however, make this method somewhat impractical in large-scale operations. In another method where aromatic halogen-containing compounds are reacted with hydrogen cyanide in the presence of a metallic catalyst, significant amounts of hydrogen halide by-products are produced along with the desired product and the process is economically feasible only where there is an established outlet or market for such by-products.

It is an object of this invention, therefore, to provide a process for the production of aromatic dinitriles which is simple, relatively inexpensive, and highly efficient, thus overcoming many of the disadvantages of the prior art.

It is a further object of the invention to provide a process for the manufacture of phthalonitriles from a readily available raw material—benzonitrile.

Other objects and advantages will become apparent from the following description of the invention.

Phthalonitriles are prepared, according to the invention, by passing benzonitrile through a heated tube at elevated temperatures in the range from 500–1000° C. The reaction is one of simple disproportionation which takes place according to the following equation:

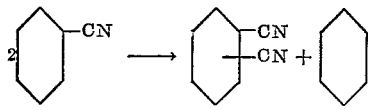

While the mechanism of the reaction has not been thoroughly explored, the probable free radical chain mechanism involved may be represented as follows:

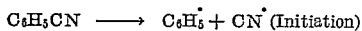
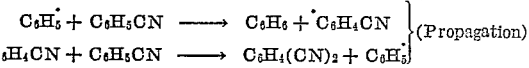

The reaction is carried out at an average reaction tube temperature in the range from 500–1000° C. and preferably at a temperature from 700–800° C. While temperatures as high as 900–1000° may be used, at these higher temperatures some difficulties are experienced due to excessive decomposition and coking.

Substantially atmospheric pressures are maintained in the preferred method of operation. However, pressure is not a critical variable and pressures materially below atmospheric or superatmospheric pressures may be employed as well without significantly altering the reaction.

In carrying out the reaction, residence time in the reactor at reaction temperature may vary widely, depending somewhat upon the reaction temperature employed. Generally speaking, a residence time within the range from about 2 to about 30 seconds is satisfactory. Little, if any, reaction occurs below a residence time of 2 seconds. A residence time of from 10–20 seconds is considered optimum for obtaining maximum yields and overall process efficiency.

The reaction tube or reactor may be fabricated from any material capable of withstanding the relatively high temperatures of the reaction. Quartz, nickel, stainless steel, or metal alloys such as that known to the trade as "Inconel" and the like are all suitable materials.

Inert gases such as steam, nitrogen, carbon dioxide and the like may be employed as diluents in amounts up to four times the quantity of benzonitrile if desired.

The following example is illustrative of the process of the invention but is not to be construed as limiting it in any manner.

Example

The reactor employed was a 1-in. stainless steel tube 18 in. long which was mounted vertically in an electric furnace. The upper portion of the tube was employed as a preheater. About 83.3 g. or 0.81 M of benzonitrile was fed into the upper end of the empty tube which was heated to a temperature of about 700–750° C., at an average space velocity of about 150 reactor volumes per hour or a residence time in the reactor of approximately 25 seconds. The product gases upon emerging from the reactor passed through a water-cooled condenser and were collected in a receiver.

The product mixture was distilled under vacuum and found to contain 3.6 g. hydrogen cyanide, 4.2 g. benzene, 71.9 g. (0.698 M) of benzonitrile, 2.0 g. of phthalonitriles, and 1.3 g. of residue. A once-through yield of phthalonitriles of 14% based on benzonitrile fed was obtained.

What is claimed is:

1. A process for the production of phthalonitriles which comprises heating benzonitrile to a temperature from about 500° to about 1000° C.

2. A process for the production of phthalonitriles which comprises heating benzonitrile to a temperature from about 700° to about 800° C.

3. A process for the production of phthalonitriles which comprises passing vapors of benzonitrile through a reaction tube heated to a temperature within the range from about 500° to about 1000° C.

4. A process for the production of phthalonitriles which comprises passing vapors of benzonitrile through a reaction tube heated to a temperature from about 700° to about 800° C. at a space velocity such that residence time in the reaction tube is from about 2 to about 30 seconds.

5. A process for the production of phthalonitriles which comprises passing vapors of benzonitrile through a reaction tube heated to a temperature of about 750° C. at a space velocity such that residence time in the reaction tube is from about 10 to about 20 seconds.

No references cited.